United States Patent [19]

Irie et al.

[11] Patent Number: 4,976,807
[45] Date of Patent: Dec. 11, 1990

[54] APPARATUS FOR STICKING A METAL CORD STRIP

[75] Inventors: Nobuhiko Irie; Jiro Agawa, both of Nagasaki, Japan

[73] Assignee: Mitsubishi Jukogyo Kabushiki Kaisha, Tokyo, Japan

[21] Appl. No.: 336,908

[22] Filed: Apr. 12, 1989

[51] Int. Cl.$^5$ .............................................. B29C 31/08
[52] U.S. Cl. ................................ 156/405.1; 156/406.4
[58] Field of Search ............... 156/405.1, 406.4, 394.1, 156/406, 406.6

[56] References Cited

U.S. PATENT DOCUMENTS 4,769,104  9/1988  Okuyama et al. ................. 156/406.4

FOREIGN PATENT DOCUMENTS

2345079A1  3/1975  Fed. Rep. of Germany .
3232162C2  3/1983  Fed. Rep. of Germany .
59-187836  10/1984  Japan .
60-54841   3/1985  Japan ................................ 156/405.1

Primary Examiner—Michael W. Ball
Assistant Examiner—Gregory J. Wilber
Attorney, Agent, or Firm—Wenderoth, Lind & Ponack

[57] ABSTRACT

An improved apparatus for sticking a metal cord strip onto a lower component layer of a tire held on a tire forming drum is disclosed. Left and right roller brackets having a plurality of guide rollers respectively mounted on opposed surfaces thereof are disposed on the left and right sides of a conveying passageway of a metal cord strip. Roller brackets moving device is adapted to move the respective roller brackets by the same amount in the directions of making them approach to or separate from a center line in the conveying direction according to the width of the metal cord strip. Left and right outlet guide plates and left and right magnets are mounted to the end portions on the downwstream side in the conveying direction of the respective roller brackets. Left and right magnet moving device are adapted to move the respective magnets beween attracting positions on the backside of the respective outlet guide plates and retreating positions separated from the respective outlet guide plates. Left and right press rollers are adapted to be lowered by press roller raising/lowering device to press the leading and trailing end portions of the metal cord strip against the tire forming drum.

1 Claim, 6 Drawing Sheets

APPARATUS FOR STICKING A METAL CORD STRIP

BACKGROUND OF THE INVENTION

1. Field of the Inventio:

The present invention relates to an apparatus for sticking a metal cord strip onto a tire component layer such as, for example, a rubber sheet layer held on a tire forming drum in a tire manufacturing machine.

1. Description of the Prior Art

A prior art apparatus for sticking a metal cord strip will now be explained with reference to FIGS. 6 and 7. In these figures reference character (a) designates a tire forming drum, character (b) designates guide plates, and (c) designates a plurality of vertical type guide rollers disposed in two rows on each guide plate (b), wherein the respective guide rollers (c) are mounted so as to be movable in the widthwise direction of the guide plate (b). In addition, reference character (d) designates width adjusting handles for adjusting the intervals in the widthwise direction of the above-mentioned two rows of guide rollers (c) a screw mechanism or the like, and character (e) designates metal cord strips, and when the metal cord strips (e) are stuck onto an outer circumferential surface of the tire forming drum (a), each of the metal cord strips (e) is fed towards the tire forming drum (a) as guided by the two rows of guide rollers (c) so that the metal cord strip (e) may be stuck onto the outer circumferential surface of a rubber sheet (a part of constituent elements of a tire, not shown) on the tire forming drum (a).

Figure 6:
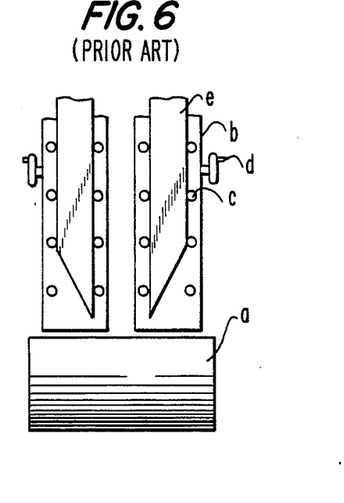
FIG. 6 is a front view showing an apparatus for sticking a metal cord strip in the prior art.
Figure 7:
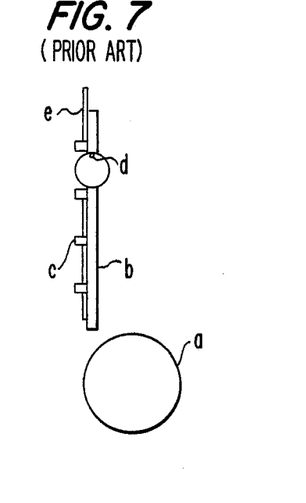
FIG. 7 is a side view of the same.

Of the metal cord strip sticking apparatus in the prior as shown in FIGS. 6 and 7, when the leading end inclined edge portion and the trailing end inclined edge portion of the metal cord strip (e) are stuck onto the outer circumferential surface of a rubber sheet on the tire forming drum (a), since a positioning device for restraining the lateral position of the metal cord strip (e) and a pressing device for pressing the leading end inclined edge portion and the trailing end inclined edge portion of the metal cord strip (e) onto the outer circumferential surface of the tire forming drum a are not provided and these operations must be carried out by workers, the sticking positions of the leading end inclined edge portion and the trailing end inclined edge portion of the metal cord strip (e) become inaccurate. Moreover, since human labor is necessary, and the sticking operation is not automated.

Figure 8:
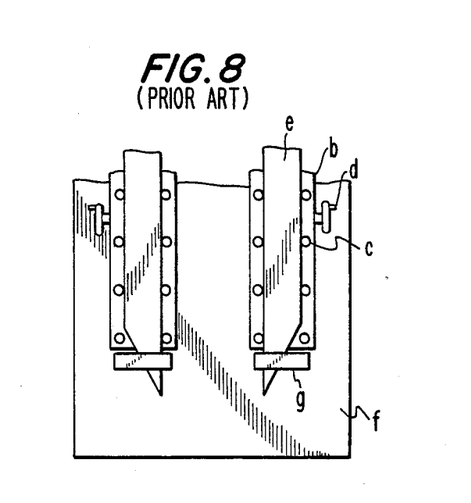
FIG. 8 is a front view showing another example of a metal cord strip sticking apparatus in the prior art.
Figure 9:
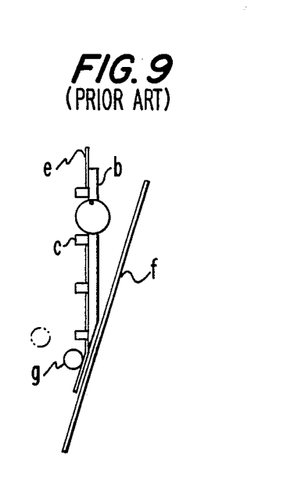
FIG. 9 is a side view of the same.

Furthermore, another example of an apparatus for sticking a metal cord strip in the prior art is shown in FIGS. 8 and 9. In these figures, reference character (b) designates guide plates, and character (c) designates a plurality of vertical type guide rollers disposed in two rows on each of the guide plates (b), wherein the respective guide rollers (c) are mounted so as to be movable in the widthwise direction of the guide plate (b). In addition, reference character (d) designates width adjusting handles for adjusting the intervals in the widthwise direction of the above-mentioned two rows of guide rollers (c) via screw mechanisms or the like, character (e) designates metal cord strips, character (f) designates a rubber sheet (a part of constituent elements of a tire) disposed on the backside of the above-mentioned guide plate (b), and reference character (g) designates press rollers movable in the direction of arrows, wherein when the metal cord strips (e) are stuck onto the outer circumferential surface of the tire forming drum (a), each of the metal cord strips (e) is fed towards the tire forming drum (a) as guided by the two rows of guide rollers (c). Subsequently press rollers (g) are moved from the positions shown by the dashed lines to the positions shown by the solid lines to bring the leading end inclined edge portion and the trailing end inclined edge portion of the metal cord strip (e) into press contact with the rubber sheet (f) to stick the former to the latter, and then the rubber sheet (f) is fed towards the tire building drum so that it may be wrapped around the outer circumferential surface of the tire building drum.

Of the metal cord strip sticking apparatus in the prior art as shown in FIGS. 8 and 9, when the leading end inclined edge portion and the trailing end inclined edge portion of the metal cord strip (e) are stuck onto the rubber sheet (f), since a positioning device for restraining the lateral position of the metal cord strip (e) is not provided and this operation is carried out by workers, the sticking positions of the leading end inclined edge portion and the trailing end inclined edge portion of the metal cord strip (e) become inaccurate.

Figure 10:
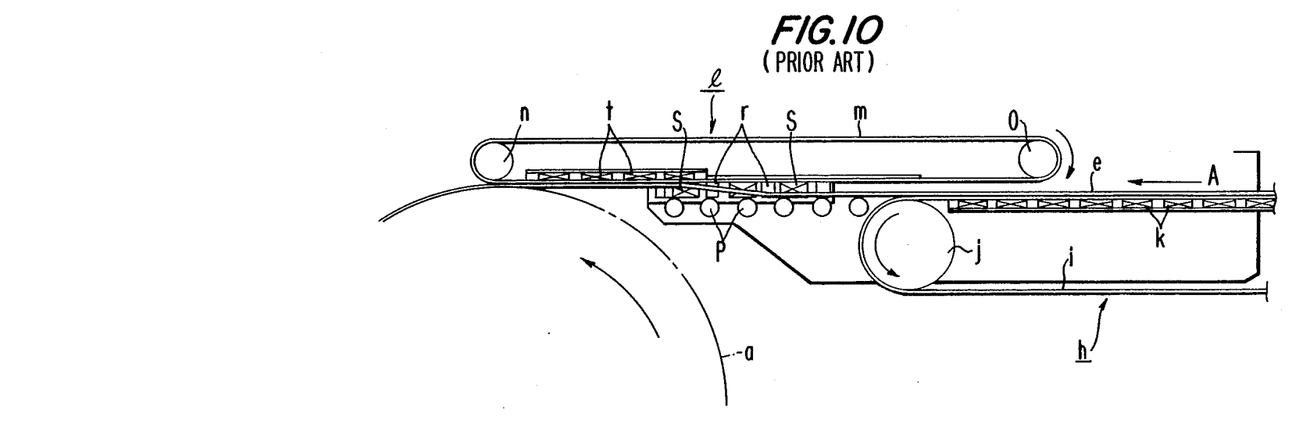
FIG. 10 is a side view showing still another example of a metal cord strip sticking apparatus in the prior art.
Figure 11:
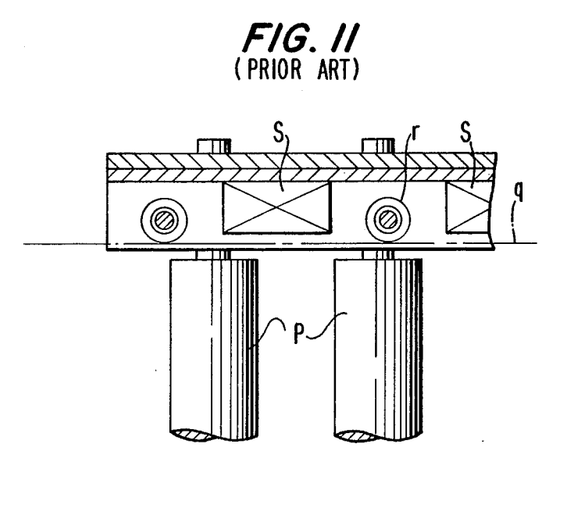
FIG. 11 is a plan view showing a part of the same apparatus in an enlarged scale.

In addition, a still further example of the metal cord strip sticking apparatus of the prior art is shown in FIGS. 10 and 11. In these figures, reference character (a) designates a tire forming drum, character (e) designates a metal cord strip, character (h) designates a first belt conveyor, character (i) designates a conveyor belt of the first belt conveyor (h), character (j) designates a drive roller for the conveyor belt (i), character (k) designates a plurality of magnets disposed right under the upper portion of the above-mentioned conveyor belt (i), character (l) designates a second belt conveyor which can travel back and forth, character (m) designates a conveyor belt of the second belt conveyor (l), characters (n) and (o) designate pulleys for the conveyor belt (m), character (p) designates a free roller conveyor disposed under the second belt conveyor (l), character (q) designates a positioning line upon conveyance of the metal cord strip which is an extension of one side edge of the upper portion of the conveyor belt (i) of the above-mentioned first belt conveyor (h), character (r) designates a plurality of guide rollers disposed along the positioning line (q), and character (s) designates a plurality of magnets disposed alternately with the respective guide rollers (r).

In operation, at first the metal cord strip (e) is placed on the upper portion of the conveyor belt (i) of the first belt conveyor (h), subsequently the second belt conveyor (l) advances until the front end portion of the second belt conveyor (l) is positioned right above the tire forming drum (a). Then the drive roller (j) for the first belt conveyor (h) and the tire forming drum (a) are driven, the movement of the same drive motor (j) is transmitted to the second belt conveyor (l) so that the second belt conveyor (l) is driven synchronously with the first belt conveyor (h), and the metal cord strip (e) on the first belt conveyor (h) is conveyed in the direction of arrow (A). At this time, the metal cord strip (e) is attracted by the respective magnets (k) and is thereby kept in tight contact with the conveyor belt (i). This metal cord strip (e) being conveyed in the direction of arrow (A) by the first belt conveyor (h) is soon transferred onto the free roller conveyor (p), it hence it leaves the magnetic field of the respective magnets (k) and enters the magnetic field of the respective magnets (s). While the metal cord strip (e) is attracted by the respective magnets (s), it comes into contact with the respective guide rollers (r), thus advancing along the positioning line (q) upon conveyance, and then leaving the magnetic field of the respective magnets (s) and entering the magnetic field of the respective magnets (t). Hence it floats up from the free roller conveyor (p) where attracted by the respective magnets (t), and comes into tight contact with the lower portion of the conveyor belt (m) of the second belt conveyor (l). Thereafter it is conveyed by the conveyor belt (m) of the second belt conveyor (l) and fed to a predetermined location of the rubber sheet mounted on the tire forming drum (a), and the leading end inclined edge portion of the metal cord strip (e) is stuck onto the above-mentioned rubber sheet. When the metal cord strip (e) has been wrapped by a predetermined length around the rotating tire forming drum (a), the first belt conveyor (h) and the tire forming drum (a) stop, subsequently the second belt conveyor (l) retreats, and so, a trailing end portion of the metal cord strip (e) which has been held in tight contact with the conveyor belt (m) of the second belt conveyor (l) peels off from the conveyor belt (m). At this time, a worker cuts the metal cord strip (e) into a predetermined length which corresponds to a residual wrapping length around the tire forming drum (a), subsequently the tire forming drum (a) is driven again, and the residual length of the metal cord strip (e) is wrapped around the tire forming drum (a), so that the trailing end inclined edge portion of the metal cord strip (e) can be stuck onto the above-described rubber sheet.

Figure 12:
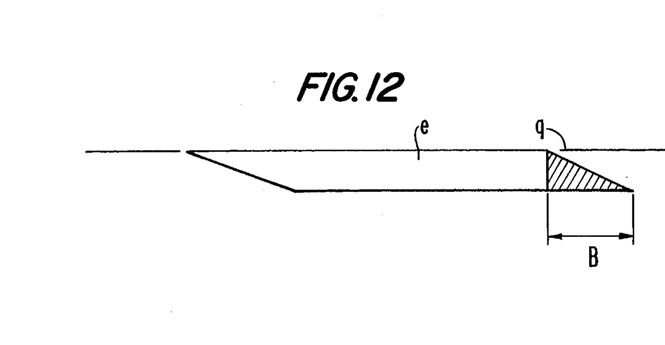
FIG. 12 is a plan view showing a metal cord strip.

Of the metal cord strip sticking apparatus in the prior art as shown in FIGS. 10 and 11, since the respective magnets (s) and the respective guide rollers (r) are disposed only along one side edge of the metal cord strip (e) to be conveyed, that is, only along the positioning line (q) upon conveyance of the metal cord strip, the other side edge portion at the trailing end of the metal cord strip (e), i.e., a hatched portion (B) shown in FIG. 12 cannot be guided. Consequently when the leading end side portion of the metal cord strip (e) has been wrapped around the tire forming drum (a), it is necessary that a worker cut the metal cord strip (e) into a predetermined length which corresponds to a residual wrapping length around the tire forming drum (a), subsequently drive again the tire forming drum (a) to wrap the residual length of the metal cord strip (e) around the tire forming drum (a), and stick the trailing end inclined edge portion of the metal cord strip (e) onto the rubber sheet, and thus automation upon sticking of the metal cord strip (e) has not yet been achieved.

In addition, since positioning of the metal cord strip (e) cannot be achieved upon its conveyance unless the metal cord strip (e) is attracted by the respective magnets (s), a large frictional resistance arises between the metal cord strip (e) and the respective guide rollers (r), resulting in deformation of the metal cord strip (e).

Also, it is necessary to adjust and maintain the relative positioning of the first belt conveyor (h) with respect to the second belt conveyor (l) at a high precision, and consequently, there is a problem in that a lot of time and labor are necessitated for maintenance and control.

SUMMARY OF THE INVENTION

It is therefore a principal object of the present invention to provide an improved apparatus for sticking a metal cord strip, in which automation upon sticking of a metal cord strip can be achieved, in which a large frictional resistance is not generated between the metal cord strip and the respective outlet guide plates as well as the respective guide rollers and hence deformation of the metal cord strip can be prevented, and which a lot of time and labor necessitated for maintenance and control can be saved.

According to one feature of the present invention, there is provided an apparatus for sticking a metal cord strip, comprising left and right roller brackets disposed respectively on the left and right sides of a conveying passageway of a metal cord strip, roller bracket moving means for moving the respective roller brackets by the same amount in the directions of making them approach to or separate from a center line in the conveying direction of the metal cord strip according to the width of the metal cord strip, left and right guide rollers mounted in multiple on the opposed surfaces of the respective roller brackets, left and right outlet guide plates and left and right magnets mounted to the end portions on the downstream side in the conveying direction of the respective roller brackets, left and right magnet moving means for moving the respective magnets between attracting positions on the backside of the respective outlet guide plates and retreating positions separated from the respective outlet guide plates, left and right press rollers adapted to be lowered for pressing the leading and trailing end portions of the metal cord strip against a tire building drum, and press roller raising/lowering means for raising and lowering the respective press rollers.

Since the metal cord strip sticking apparatus according to the present invention is constructed as featured above, when a metal cord strip is to be pressed and stuck onto a tire forming drum, it operates in the following manner. At first, the roller bracket moving means is operated to move the left and right roller brackets by the same amount in the right and left directions respectively, or in the left and right directions, respectively, so as to approach to or separate from the center line in the conveying direction of the metal cord strip. Thereby the interval between the respective guide rollers on the left and on the right is matched with the width of the metal cord strip, subsequently the metal cord strip is fed from the inlet of the present sticking apparatus towards its outlet with both its left and right side edges held in contact with the above-mentioned respective guide rollers on the left and on the right, respectively, and when the leading end inclined edge portion of the same metal cord strip has passed the last guide roller and has reached the position of one of the left and right outlet guide plates, feeding of the metal cord strip is once stopped.

Then the magnet moving means is actuated to move the magnets from the retreating positions to the attracting positions on the backside of the outlet guide plates, thereby one side edge portion at the leading end of the metal cord strip is attracted by the magnets to make the one side edge portion at the leading end of the metal cord strip butt against the above-mentioned outlet guide plate, and thereby positioning of the leading end portion of the metal cord strip is effected. Subsequently, the press raising and lowering means is actuated to lower the press roller on the side of the aforementioned outlet guide plate, thereby the leading end inclined edge portion of the metal cord strip is pressed against the tire forming drum to be brought into press contact with the tire forming drum. The the magnet moving means is then actuated to restore the above-mentioned magnets from the attracting positions to the retreating positions, subsequently feeding of the metal cord strip is recommenced, and thereby the metal cord strip can be wrapped around the tire forming drum at a good precision.

Thereafter, when the trailing end inclined edge portion of the metal cord strip has passed the last guide roller and has reached the position of the other outlet guide plate among the left and right outlet guide plates (the outlet guide plate on the opposite side to the outlet guide plate in the case of the leading end inclined edge portion), feeding of the metal cord strip is once stopped. Subsequently the magnet moving means is actuated to move the magnets from the retreating position to the attracting position on the backside of the above-mentioned outlet guide plate, thereby the inclined edge portion at the trailing end on the other side of the metal cord strip is attracted by the magnets, and one side edge portion at the trailing end of the same metal cord strip is made to butt against the aforementioned outlet guide plate to effect positioning of the trailing end portion of the metal cord strip. Then press roller raising and lowering means is then actuated to lower the press roll on the side of the above-described outlet guide plate, thereby the trailing end inclined edge portion of the metal cord strip is pressed against the tire forming drum to bring it into press contact with the outer circumferential surface of the tire forming drum, and then the magnet moving means is actuated to restore the above-mentioned magnets from the attracting position to the retreating position.

According to the present invention, since the metal cord strip sticking apparatus is constructed and operated in the above-described manner, automation of the operation of sticking a metal cord strip can be achieved.

Furthermore, since the magnets are moved to the retreating position separated from the outlet guide plate during the period other than the time of positioning, and since magnets are not disposed behind the respective guide rollers, a large frictional resistance is not generated between the metal cord strip and the respective outlet guide plates as well as the respective guide rollers, and hence, deformation of the metal cord strip can be prevented.

In addition, since it is unnecessary to adjust and maintain relative positioning between first and second belt conveyors as is the case with the above-described sticking apparatus of the prior art, the present invention offers effects and advantages in that a lot of time and labor which were necessitated for maintenance and control of the prior art device can be saved.

The above-mentioned and other objects, features and advantages of the present invention will become more apparent by reference to the following description of one preferred embodiment of the present invention taken in conjunction with the accompanying drawings.

DESCRIPTION OF THE PREFERRED EMBODIMENT

An apparatus for sticking a metal cord strip according to the present invention in connection with one preferred embodiment will now be explained with reference to FIGS. 1 to 5, in which reference numeral (1) designates an assembling plate, numerals (2a) and (2b) designate outlet guide roller blocks, numerals (3a) and (3b) designate inlet guide roller blocks, numerals (4a) and (4b) designate outlet guide plates, numerals (5a) and (5b) designate roller brackets, numeral (6) designates guide rollers, numeral (7) designates swivel bearings, numerals (8a) and (8b) designate arm brackets, numeral (9) designates magnets, numerals (10a) and (10b) designate hydraulic actuators, numerals (11a) and (11b) designate press rollers, numerals (12a) and (12b) designate roller arms, numerals (13a) and (13b) designate outlet roller arm brackets, numeral (14) designates a spline shaft, numeral (15) designates a hydraulic actuator, numerals (16a) and (16b) designate shaft support brackets, numeral (17) designates a cylindrical shaft, numerals (18a) and (18b) designate shaft support brackets, numerals (19), (20), (21) and (22) designate slide blocks, numerals (23) to (29) designate links, numeral (30) designates a bracket, numeral (31) designates a pin, numeral (32) designates a spline shaft, numeral (33) designates a ball spline, numeral (34) designates a spring, numerals (35) and (36) designate elongation restricting stoppers, numeral (37) designates a bearing housing, numeral (38) designates a pin, numerals (39), (40) and (41) designate retaining rings, numerals (42) and (43) designate bearings, numeral (44) designates a supporting frame, numerals (45) to (50) designate pins, numeral (51) designates a retaining ring, numeral (52) designates a pin, numeral (53) designates a bearing housing, reference character (a) designates a tire forming drum, and character (e) designates a metal cord strip.

Figure 1:
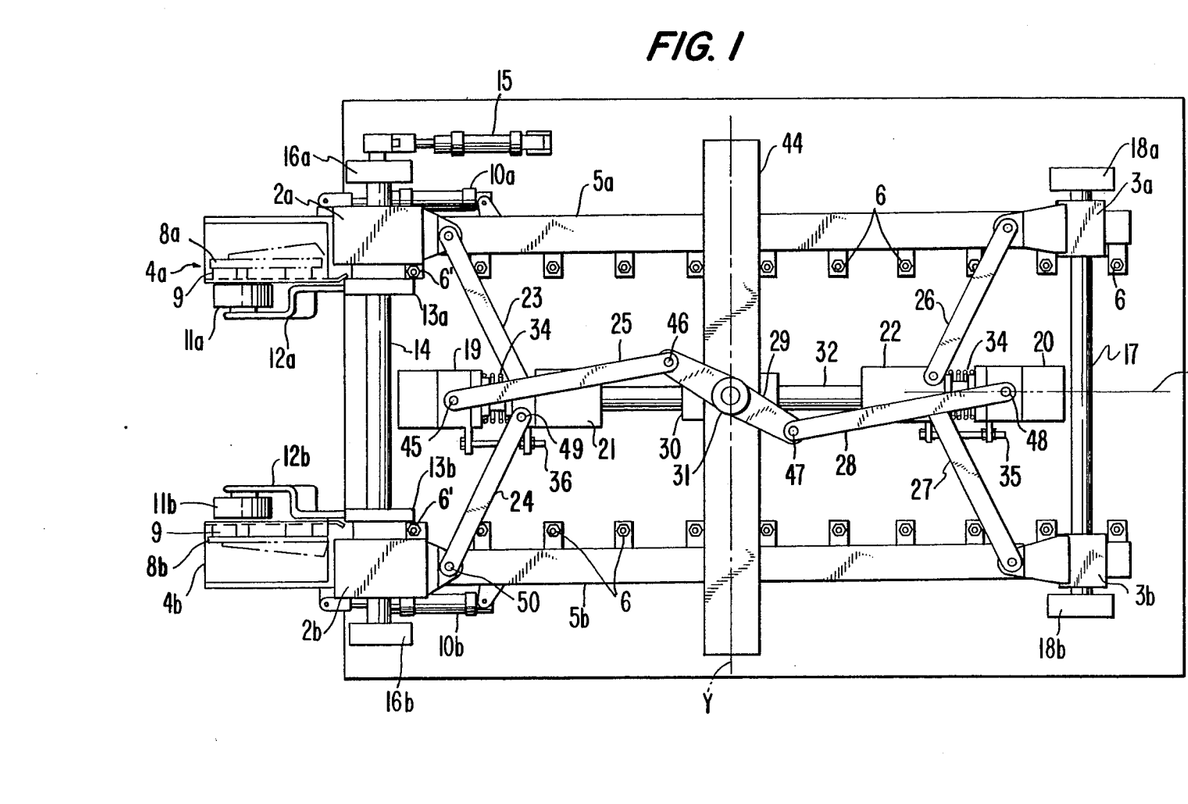
FIG. 1 is a plan view of an apparatus for sticking a metal cord strip according to one preferred embodiment of the present invention.
Figure 2:
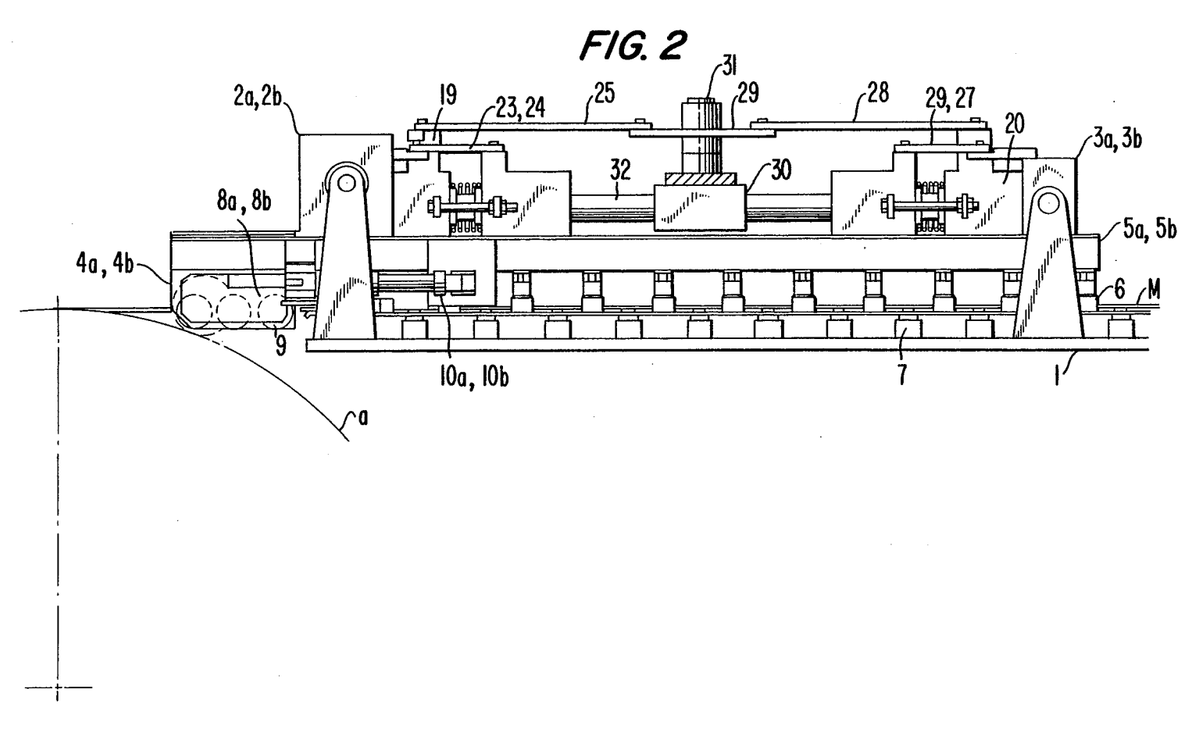
FIG. 2 is a side view of the same.
Figure 3:
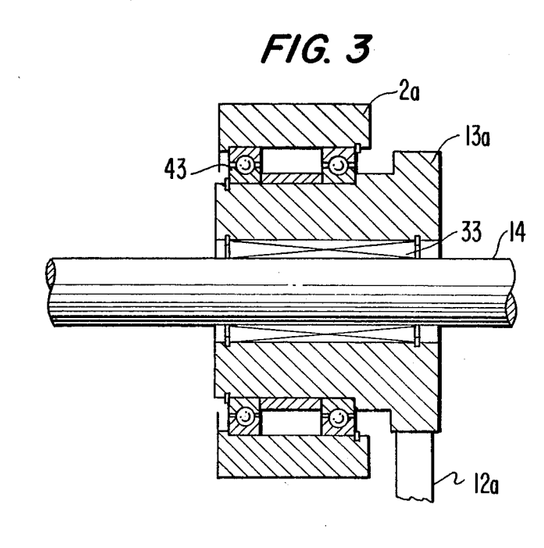
FIG. 3 is a longitudinal cross-section front view showing the relation between an outlet roller arm bracket and a spline shaft.

The shaft support brackets (16a), (16b) and (18a), (18b) are fixedly secured to the assembling plate (1), the spline shaft (14) is rotatably supported by these shaft support brackets (16a) and (16b), the cylindrical shaft (17) is unrotatably supported by the shaft support brackets (18a) and (18b), the outlet roller arm brackets (13a) and (13b) are mounted on the spline shaft (14) via the ball spline (33) so as to be unrotatable but movable in the axial direction, and the outlet guide roller blocks (2a) and (2b) are mounted on the spline shaft (14) via the bearing (43) so as to be rotatable but unmovable in the axial direction. In addition, the inlet guide roller blocks (3a) and (3b) are mounted on the cylindrical shaft (17) via a slide bearing (not shown) so as to be movable in the axial direction. Also, the spline shaft (32) is disposed on a center line (X) in the conveying direction of the metal cord strip (e), and (32) is fixed to the bracket (30).

This bracket (30) is fixed to the assembling plate (1) via a support frame (44). The slide blocks (19), (20), (21) and (22) are mounted on the spline shaft (32) so as to be unrotatable but movable in the axial direction. The springs (34) are interposed between the slide blocks (20) and (22) and between the slide blocks (19) and (21), respectively, the elongation restricting stopper (35) for restricting elongation of the spring (34) is interposed between the slide blocks (20) and (22), and the elongation restricting stopper (36) for restricting elongation of the other spring (34) is interposed between the slide blocks (19) and (21). A pin (45) is mounted on the slide block (19) and the link (25) is rotatably supported by the same pin (45). Also, a pin (48) is mounted on the slide block (20), the link (28) is rotatably supported by the same pin (48), and the opposite end portions of the link (29) are rotatably mounted via pins (46) and (47), respectively, to the tip end portions of the links (25) and (28), respectively, the central portion of the same link (29) is rotatably mounted via the pin (31) to the bracket (30), so that if the link (29) is rotated, the movement is transmitted via the links (25) and (28) to the slide block (19) and (20), respectively, and the slide blocks (19) and (21) and the slide blocks (20) and (22) would be moved synchronously in the axial directions along the spline shaft (32). Also, a pin (49) is mounted on the slide block (21) and the link (24) is rotatably supported by the same pin (49), and the other end portion of the same link (24) is rotatably mounted to the outlet guide roller block (2b) via a pin (50). In addition, the link (23) similarly connects the slide block (21) and the outlet guide roller block (2a), and if the slide blocks (19) and (21) move in the axial direction along the spline shaft (32) as described above, the movement is transmitted via the links (23) and (24) to the outlet guide roller blocks (2a) and (2b), and hence the outlet guide roller blocks (2a) and (2b) would move in the axial direction along the spline shaft (14), so that the interval between the outlet guide roller blocks (2a) and (2b) may be narrowed or broadened with the center line (X) in the conveying direction of the metal cord strip (e) held at the center of the interval. Also, the link (26) connects the slide block (22) with the inlet guide roller block (3a), while the link (27) connects the slide block (22) with the inlet guide roller block (3b). Hence if the slide blocks (20) and (22) move in the axial direction along the spline shaft (32) as described above, the movement is transmitted via the links (26) and (27) to the inlet guide roller blocks (3a) and (3b), and the inlet guide roller blocks (3a) and (3b) would move in the axial direction along the cylindrical shaft (17), so that the interval between the inlet guide roller blocks (3a) and (3b) may be narrowed or broadened with the center line (X) in the conveying direction of the metal cord strip (e) held at the center of the interval.

Figure 5:
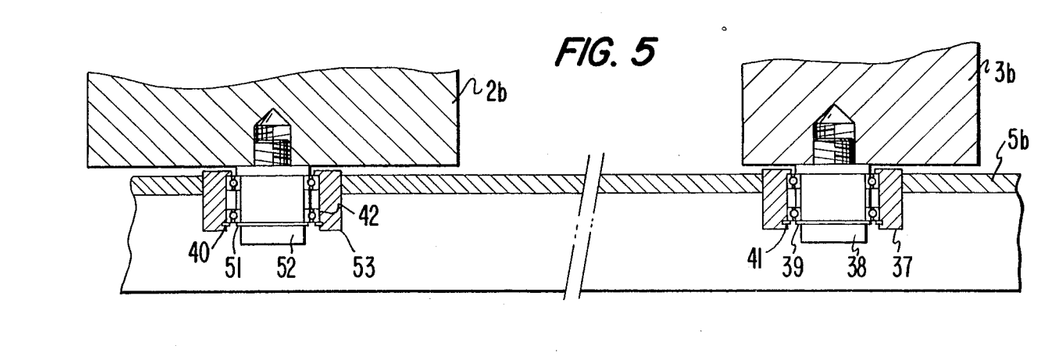
FIG. 5 is a longitudinal cross-section side view showing a roller bracket portion.

As shown in FIG. 5, a pin (38) is fixedly secured to the bottom of the inlet guide roller block (3b), a bearing housing (37) is fixedly secured to the roller bracket (5b), a bearing (41) is interposed between the bearing housing (37) and the pin (38), while a pin (52) is fixedly secured to the bottom of the outlet guide roller block (2b), a bearing housing (53) is fixedly secured to the roller bracket (5b), and a bearing (42) is interposed between the bearing housing (53) and the pin (52). The roller bracket (5a) is also mounted between the outlet guide roller block (2a) and the inlet guide roller block (3a) similarly to the above-mentioned roller bracket (5b), on the opposed surfaces of these roller brackets (5a) and (5b) are mounted a plurality of guide rollers (6), and these respective guide rollers (6) are adapted to guide the metal cord strip (e) from the inlet towards the outlet as held in contact with the left and right side edges of the metal cord strip (e). In addition, a plurality of swivel bearings (7) for supporting the metal cord strip (e) in a conveyable manner are mounted on the assembling plate (1) in a dispersed state. Furthermore, an outlet guide plate (4a) made of non-magnetic material is fixedly secured to the roller bracket (5a) so that the contact surface of the outlet guide plate (4a) may be positioned on an extension plane formed by extending an imaginary plane connecting the contact surfaces of the respective guide rollers (6) mounted on the above-mentioned roller bracket (5a), towards the outlet. A plurality of magnets (9) are fixedly secured to an arm bracket (8a) positioned on the backside of the contact surface of the above-mentioned outlet guide plate (4a), the arm bracket (8a) is swingably mounted to the roller bracket (5a) via a pin (65), the other end portion of the same arm bracket (8a) is mounted to the hydraulic actuator (10a), and the rear end portion of the same hydraulic actuator (10a) is mounted to the roller bracket (5a), so that the hydraulic actuator (10a) is operated in its extension/contraction directions, the movement is transmitted to the arm bracket (8a) so as to swing the arm bracket (8a) about the pin (65), and thereby the respective magnets (9) can be made to approach to or separate from the outlet guide plate (4a) made of non-magnetic material. Likewise, an outlet guide plate (4b) made of non-magnetic material is fixedly secured to the roller bracket (5b) so that the contact surface of the outlet guide plate (4b) may be positioned on an extension plane formed by extending an imaginary plane connecting the contact surfaces of the respective guide rollers (6) mounted on the above-mentioned roller bracket (5b), towards the outlet. A plurality of magnets (9) are fixedly secured to an arm bracket (8b) positioned on the backside of the contact surface of the above-mentioned outlet guide plate (4b), the arm bracket (8b) is swingably mounted to the roller bracket (5b) via a pin (65), the other end portion of the same arm bracket (8a) is mounted to the hydraulic actuator (10b), and the rear end portion of the same hydraulic actuator (10b) is mounted to the roller bracket (5b), so that the hydraulic actuator (10b) is operated in the extension/contraction directions, the movement is transmitted to the arm bracket (8b) so as to swing the arm bracket (8b) about the pin (65), and thereby the respective magnets (9) can be made to approach to or separate from the outlet guide plate (4b) made of non-magnetic material.

In addition, a press roller (11a) is disposed so as to come close to or come into light contact with an end surface of the outlet guide plate (4a). The press roller (11a) is rotatably supported by an arm (12a), and the arm (12a) is fixedly secured to a roller arm bracket (13a). Likewise, a press roller (11b) is disposed so as to come close to or come into light contact with an end surface of the outlet guide plate (4b), the press roller (11b) is rotatably supported by an arm (12b), and the arm (12b) is fixedly secured to a roller arm bracket (13b). As described previously, the above-mentioned roller arm brackets (13a) and (13b) are mounted to shaft (14) so as to be unrotatable but movable in the axial direction. The spline shaft (14) is adapted to be rotated by a certain angle by means of a hydraulic actuator (15), so that the press rollers (11a) and (11b) can be swung up and down as a result of rotation of this spline shaft (14).

Now the operation of the metal cord strip sticking apparatus shown in FIGS. 1 to 5 will be explained in detail.

In operation, the link (29) is rotated, the movement is transmitted to the slide blocks (19) and (20) via the links (25) and (28), and thereby the slide blocks (19) and (21) and the slide blocks (20) and (22) are synchronously moved in the axial direction along the spline shaft (32). Also, the movement of the slide blocks (19) and (21) is transmitted to the outlet guide roller blocks (2a) and (2b) via the links (23) and (24) to cause the outlet guide roller blocks (2a) and (2b) to move along the spline shaft (14), and thereby the interval between the outlet guide roller blocks (2a) and (2b) is narrowed or broadened. At the same time, the movement of the slide blocks (20) and (22) is transmitted to the inlet guide roller blocks (3a) and (3b) via the links (26) and (27) to cause the inlet guide roller blocks (3a) and (3b) to move along the spline shaft (14), and thereby the interval between the inlet guide roller blocks (3a) and (3b) is narrowed or broadened. Thereby the interval between the roller bracket (5a) supported by the above-mentioned outlet guide roller block (2a) and the above-mentioned inlet guide roller block (3a) as well as the respective guide rollers (6) and the roller bracket (5b) supported by the above-mentioned outlet guide roller block (2b) and the above-mentioned inlet guide roller block (3b) as well as the respective guide rollers (6), can be adjusted so as to match the lateral width of the metal cord strip (e) that is to be fed. Subsequently, the metal cord strip (e) is fed from the inlet of this sticking apparatus towards its outlet with its bottom surface kept in contact with the respective swivel bearings (7) and with its both left and right side edges held in contact with the guide rollers (6). Meanwhile, when the leading end inclined edge portion of the metal cord strip (e) has passed the last guide roller (6') and has reached the position (the position of the outlet guide plate (4b) made of non-magnetic material) shown in FIG. 4, the feed of the metal cord strip (e) is once stopped. Then the hydraulic actuator (10b) is actuated in the extending direction, the movement is transmitted to the arm bracket (8b) to swing the arm bracket (8b) about the pin (65), and thereby the respective magnets (9) are moved to the position close to the outlet guide plate (4b) (the attracting position). Thus, one side edge portion at the leading end of the metal cord strip (e) is made to butt against the outlet guide plate (4b) made of non-magnetic material to perform positioning of the leading end portion of the metal cord strip (e).

Figure 4:
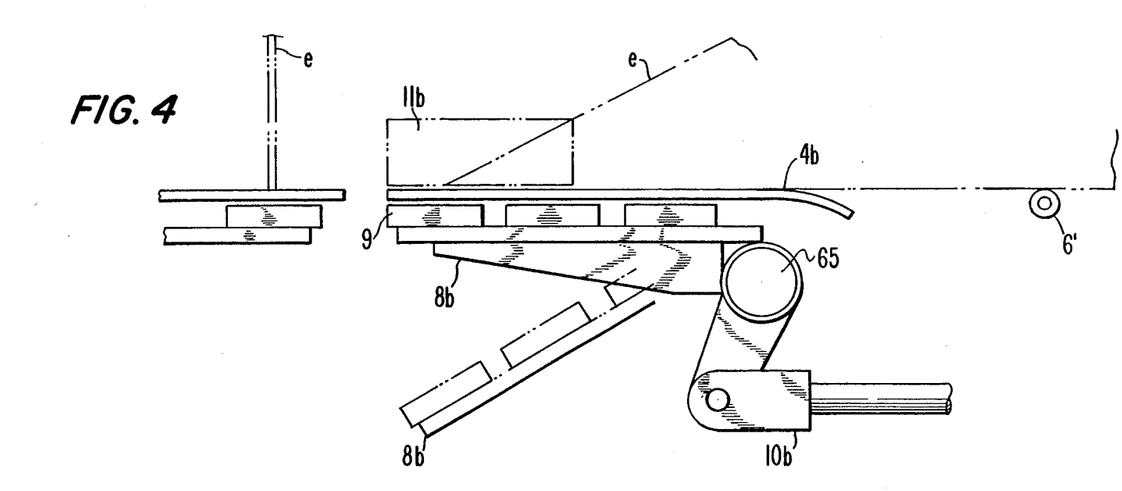
FIG. 4 is a schematic view for explaining operations of an outlet guide plate and magnets.

Subsequently, the hydraulic actuator (15) is operated to rotate the spline shaft (14) and to lower the press roller (11b), and thereby the leading end inclined edge portion of the metal cord strip (e) is pressed against the tire forming drum (a) and is held in press contact with the outer circumferential surface of the tire forming drum (a). Then, the hydraulic actuator (10b) is operated in the contracting direction, the movement of the actuator (10b) is transmitted to the arm bracket (8b), thereby the arm bracket (8b) is made to swing about the pin (65), hence the respective magnets (9) are separated from the outlet guide plate (4b) made of non-magnetic material and are restored to their original position (the retreating position), then the feed of the metal cord strip (e) is recommenced, and the metal cord strip (e) is wrapped around the tire forming drum (a) at a good precision.

When the trailing end inclined edge portion of the metal cord strip (e) has passed the last guide roller (6') and has reached the position of the outlet guide plate (4a), the feed of the metal cord strip (e) is once stopped. Then the hydraulic actuator (10a) on the opposite side is operated in the extending direction, the movement is transmitted to the arm bracket (8a) to swing the arm bracket (8a) about the pin (65), and thereby the respective magnets (9) are moved to the position close to the outlet guide plate (4a) made of non-magnetic material (the attracting position), thereby the trailing end side edge portion on the opposite side of the metal cord strip (e) is attracted by the magnets (9), thus the trailing end side edge portion on the opposite side of the metal cord strip (e) is made to butt against the outlet guide plate (4a) made of non-magnetic material to perform positioning of the trailing end portion of the metal cord strip.

Next, the hydraulic actuator (15) is operated to rotate the spline shaft (14) and to lower the press roller (11a), and thereby the trailing end inclined edge portion of the metal cord strip (e) is pressed against the tire forming drum (a) and is held in press contact with the outer circumferential surface of the tire forming drum (a). Then the hydraulic actuator (10a) is operated in the contracting direction, the movement of the actuator (10a) is transmitted to the arm bracket (8a), thereby the arm bracket (8a) is made to swing about the pin (65), and so, the respective magnets (9) are separated from the outlet guide plate (4a) made of non-magnetic material and are restored to their original position (the retreating position).

As will be apparent from the above detailed description above, according to the present invention, automation of the operation of sticking a metal cord strip can be achieved. The roller bracket moving means is operated to move the left and right roller brackets by the same amount in the right and left directions, respectively, or in the left and right directions, respectively, so as to approach to or separate from the center line in the conveying direction of the metal cord strip, thereby the interval between the respective guide rollers on the left and on the right is matched with the width of the metal cord strip. Subsequently the metal cord strip is fed from the inlet of the present sticking apparatus towards its outlet with its both left and right side edges held in contact with the above-mentioned respective guide rollers on the left and on the right, respectively, and when the leading end inclined edge portion of the same metal cord strip has passed the last guide roller and has reached the position of one of the left and right outlet guide plates, feeding of the metal cord strip is once stopped. Then the magnet moving means is actuated to move the magnets from the retreating positions to the attracting positions on the backside of the outlet guide plates, thereby one side edge portion at the leading end of the metal cord strip is attracted by the magnets to make the one side edge portion at the leading end of the metal cord strip butt against the above-mentioned outlet guide plate, and thereby positioning of the leading end portion of the metal cord strip is effected. Subsequently the press roller raising and lowering means is actuated to lower the press roller on the side of the aforementioned outlet guide plate, thereby the leading end inclined edge portion of the metal cord strip is pressed against the tire forming drum to be brought into press contact with the tire forming drum. Then the magnet moving means is actuated to restore the above-mentioned magnets from the attracting positions to the retreating positions, subsequently feeding of the metal cord strip is recommenced, and thereby the metal cord strip can be wrapped around the tire forming drum at a good precision. Thereafter when the trailing end inclined edge portion of the metal cord strip has passed the last guide roller and has reached the position of the other outlet guide plate among the left and right outlet guide plates (the outlet guide plate on the opposite side to the outlet guide plate in the case of the leading end inclined edge portion), feeding of the metal cord strip is once stopped, and subsequently the magnet moving means is actuated to move the magnets from the retreating positions to the attracting positions on the backside of the above-mentioned outlet guide plate, thereby the inclined edge portion at the trailing end on the other side of the metal cord strip is attracted by the magnets, and thus one side edge portion at the trailing end of the same metal cord strip is made to butt against the aforementioned outlet guide plate to effect positioning of the trailing end portion of the metal cord strip. Then the press roll raising and lowering means is actuated to lower the press roll on the side of the above-described outlet guide plate, thereby the trailing end inclined edge portion of the metal cord strip is pressed against the tire forming drum to bring it into press contact with the outer circumferential surface of the tire forming drum, and then the magnet moving means is actuated to restore the above-mentioned magnets from the attracting position to the retreating position.

Furthermore, since the magnets are moved to the retreating position separated from the outlet guide plate during the period other than the time of positioning, and since magnets are not disposed behind the respective guide rollers, a large frictional resistance is not generated between the metal cord strip and the respective outlet guide plates as well as the respective guide rollers, and hence, deformation of the metal cord strip can be prevented.

In addition, since it is unnecessary to adjust and maintain relative positioning between first and second belt conveyors as is the case with the above-mentioned sticking apparatus in the prior art, the present invention offers effects and advantages in that a lot of time and labor which were necessitated for maintenance and control in the prior art can be saved.

While a principle of the present invention has been described above in connection to one preferred embodiment of the invention, it is a matter of course that many apparently widely different embodiments of the present invention could be made without departing from the spirit of the present invention.

What is claimed is:

1. An apparatus for sticking a metal cord strip comprising: left and right roller brackets disposed respectively on left and right sides of a conveying passageway of a metal cord strip; roller bracket moving means for moving said respective left and right roller brackets by a same amount in a direction towards or away from a center line in the conveying direction of the metal cord strip according to a width of the metal cord strip; left and right guide rollers mounted in multiple on opposed surfaces of said respective left and right roller brackets; left and right outlet guide plates and left and right magnets mounted to end portions on the downstream side in the conveying direction of said respective left and right roller brackets; left and right magnet moving means for moving said respective left and right magnets between attracting positions on a backside of said respective left and right outlet guide plates and retreating positions separated from said respective left and right outlet guide plates; left and right press rollers adapted to be lowered for pressing a leading and a trailing end portion of the metal cord strip against a tire forming drum; and, press roller raising and lowering means for raising and lowering said respective left and right press rollers.

* * * * *